United States Patent [19]

Carter et al.

[11] 3,784,239
[45] Jan. 8, 1974

[54] SEALED, FILAMENT-WOUND PLASTIC SLEEVE

[76] Inventors: J. Warne Carter, 2206 Weeks Park Ln., Wichita Falls, Tex.; Martin Duane Neher, 900 Aztec St., Burkburnett, Tex. 76354

[22] Filed: Sept. 7, 1971

[21] Appl. No.: 178,239

[52] U.S. Cl............. 285/293, 285/332.1, 285/392, 285/423
[51] Int. Cl............................................. F16l 47/00
[58] Field of Search............... 285/293, 334, 332.1, 285/392, 423, DIG. 16, 332, 363, 399, 331

[56] References Cited
UNITED STATES PATENTS

| | | | |
|---|---|---|---|
| 1,590,357 | 6/1926 | Feisthamel | 285/332.1 |
| 2,498,831 | 2/1950 | Veitch | 285/DIG. 16 |
| 2,876,154 | 3/1959 | Usab | 285/DIG. 16 |
| 2,933,428 | 4/1960 | Mueller | 285/423 X |
| 3,245,701 | 4/1966 | Leopold et al. | 285/DIG. 16 |
| 3,264,013 | 8/1966 | Richardson et al. | 285/423 X |
| 3,463,518 | 8/1969 | Broussard et al. | 285/363 X |
| 3,508,771 | 4/1970 | Duret | 285/334 |
| 3,667,784 | 6/1972 | Hokanson et al. | 285/334 X |

Primary Examiner—Dave W. Arola
Assistant Examiner—Wayne L. Shedd
Attorney—Harry Goldsmith et al.

[57] ABSTRACT

A sealing ring joint for non-ferrous pipe or tubing is formed by fixing an external engaging sleeve to the end of a section of pipe or tubing and by fixing a collar member to the end of another section of pipe or tubing. External engaging means on the sleeve coact with internal engaging means in the collar to fasten the sleeve to the collar, while mating tapered sections on the sleeve and the collar coact to position, fasten and seal the sleeve in the collar when the external engaging means is engaged with the internal engaging surface of the collar. A sealing ring groove disposed on the tapered section within the collar positions a sealing ring which coacts with the external engaging sleeve and the sealing ring groove of the collar to effectively provide a pressure seal for the joint.

The collars are made by a filament winding process in which die members, including at least one deformable die member, are arranged into collar-forming sets which are assembled in series on a mandrel.

4 Claims, 6 Drawing Figures

J. WARNE CARTER
MARTIN DUANE NEHER
*INVENTORS*

PATENTED JAN 8 1974  3,784,239

J. WARNE CARTER
MARTIN DUANE NEHER
*INVENTORS*

SEALED, FILAMENT-WOUND PLASTIC SLEEVE

This invention relates to pipe joint constructions and, more particularly, to the provision of attaching means to the ends of pipes or tubing for effectively joining one pipe or tubing section to another.

BACKGROUND OF THE INVENTION

The use of non-ferrous piping and tubing has long been hindered by problems in effectively joining one section of pipe or tubing to another. The standard method used for assembling pipes and tubing of non-ferrous materials is to lay out the sections of pipe or tubing at the place of intended use and then to connect the sections by bonding them with an adhesive.

This method of assembly in the field poses many problems. The time necessary to complete a bond between one pipe section and another is too great to allow the bond between each of the adjoining sections to be completed before the next section must be positioned and connected. Therefore, extreme care must be taken not to disrupt any of the uncompleted pipe connections while working on the connections between other pipe sections.

Further, the pipes or tubing are usually assembled under field conditions which are substantially less than ideal. Often, the pipes or tubing are to be laid through dirty or swampy areas which tend to contaminate the connection and prevent a good bond. Weather conditions at the time of assembly can vary greatly from one installation to another, causing uncertainty as to the time required to complete each connection. Because of the possible complications and the high degree of care required to assemble these non-ferrous pipe sections by bonding in the field, faulty joints between pipe sections are frequently produced. Additionally, because the various pipe sections are bonded, they cannot be easily disassembled once they have been assembled. Therefore, it is very difficult to make any changes or alterations or repairs to a pipe or tubing system once the initial assembly has been completed.

SUMMARY OF THE INVENTION

In order to overcome these problems inherent in the prior art, the present application sets forth an apparatus and method for providing a filament wound sealing ring pipe joint which can be easily assembled and disassembled. An external engaging sleeve is positioned on the end of a pipe or tubing section by mating tapered surfaces on the end of the pipe and the engaging sleeve. A filament wound collar is similarly fitted to the end of another pipe or tubing section by mating tapered surfaces. The external engaging sleeve is adapted to threadably or otherwise reversably engage an engaging surface on the inner surface of the filament wound collar. A sealing ring positioned within a sealing ring groove on the inner surface of the collar coacts with the external engaging sleeve when the sleeve is engaged with the collar to provide an effective pressure seal for the joint.

The filament wound collar is made by a filament winding process which produces one or more collars during a single filament winding operation. A plurality of collar-forming sets, each consisting of several die members, are positioned along a mandrel with spacing rings positioned at the ends of each collar-forming set, and resin-coated glass filament is wound over the die assembly in a conventional manner to form a continuous filament winding. After the glass filament winding is cured, the mandrel is removed and individual collars are severed from the continuous winding by cutting through the winding at the location of the spacing rings. Each of the severed collars contains its collar-forming set. At this point, less than all of the die members in each collar-forming set can be removed from the formed collars because of the internal shape of the collar. Therefore, the collar and the die members remaining therein are reheated so that the die members remaining in the collar can be deformed sufficiently to be removed.

Accordingly, in view of the above, it is an object of the invention to provide a joint for non-ferrous pipe and tubing consisting of completely prefabricated components which can be easily fastened together without the use of chemical bonding.

Another object of the invention is to provide a joint for non-ferrous pipes and tubing consisting of components which can be easily engaged to form a sealed joint and can then be easily disengaged, the components being readily reusable.

Yet another object of the invention is to provide a joint for non-ferrous pipes and tubing consisting of components which can be threadably engaged and disengaged.

Still another object of the invention is to provide a joint for non-ferrous pipes and tubing which includes a sealing means in the joint to provide a pressure seal.

A further object of the invention is to provide a joint for non-ferrous pipes and tubing consisting of joining members having mating tapered surfaces to position the joining members with respect to each other.

Still another object of the invention is to provide a joint for non-ferrous pipes and tubing having joining members which are positioned on the ends of the pipe or tubing sections to be joined by means of mating tapered surfaces on the joining members and the end of the pipe or tubing to which they are attached.

Yet another object of the invention is to provide a joint for non-ferrous pipes and tubing which can be quickly and easily assembled under adverse field conditions and which does not require delicate handling at any time during assembly of the joint.

Another object of the invention is to provide a joint for non-ferrous pipes and tubing which is relatively inexpensive to fabricate, simple in construction, and durable in operation.

Still another object of the invention is to provide a filament wound collar for pipes and tubing joints which includes an O-ring receptacle to provide an effective seal when the collar is assembled in the joint.

Another object of the invention is to provide a method for manufacturing filament wound collars for pipe and tubing joints which efficiently provides several collars in a single operation.

Still another object of the invention is to provide a method for manufacturing filament wound collars for pipe and tubing joints which produces collars requring a minimum of finish machining.

Yet another object of the invention is to provide a method for manufacturing filament wound collars for pipe and tubing joints which produces a one-piece collar having an internal sealing ring groove, without having to destroy the winding die for producing the grooved section in the collar.

These, and other advantages and improved results of the invention, will be apparent from the following detailed description, taken in conjunction with the drawings illustrating a preferred embodiment of the invention.

DESCRIPTION OF THE PREFERRED EMBODIMENT

Figure 1:
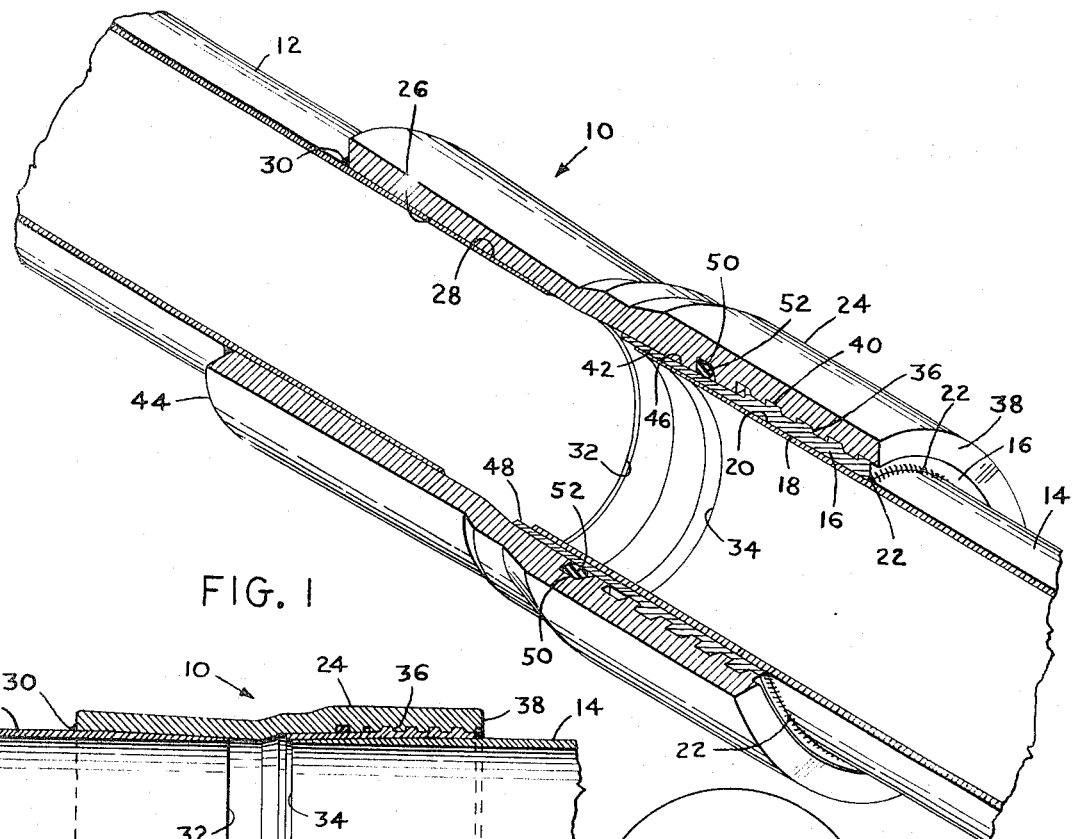
FIG. 1 is a perspective view, broken away, showing a sealing ring joint for pipes or tubing built in accordance with the present invention.
Figure 2:
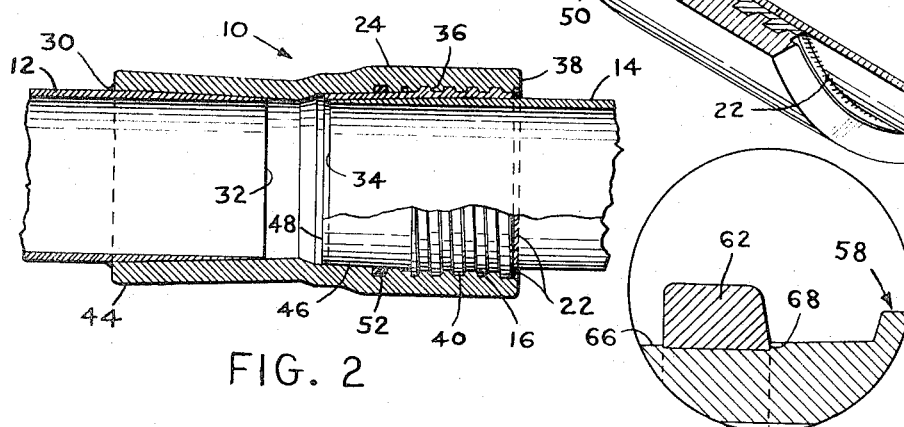
FIG. 2 is a side elevation, partially broken away, of the sealing ring joint shown in FIG. 1.

FIGS. 1 and 2 show a pipe joint in assembled condition, generally indicated as 10. The pipe joint consists of two pipe or tubing ends 12 and 14 which are to be joined. An external engaging sleeve 16 is positioned on the end of the pipe section 14 by means of mating tapers 18 and 20 respectively on the internal surface of the engaging sleeve 16 and the external surface of the pipe section 14, and is chemically bonded thereto, as shown by the bonding seam 22.

In a similar manner, a collar 24 is positioned on the end of pipe section 12 by mating tapered sections 26 and 28 respectively on the inner wall of collar 24 and the outer surface of pipe 12, and then is chemically bonded thereto, as shown by bonding seam 30. It should be noted that with the pipe sections properly positioned in the collar and external engaging sleeve, that there is a space between the ends 32 and 34 of pipe sections 12 and 14 respectively when external engaging sleeve 16 is connected to the collar 24.

The collar includes a section having internal engaging means in the form of internal threads 36 adjacent to the engaging end 38 of the collar. The internal engaging means engage external engaging means in the form of external threads 40 on the external engaging sleeve 16. A tapered section 42 on the inner surface of collar 24 narrows toward the other end of the collar 44 and is adapted to mate with a tapered section 46 on the outer surface of external engaging means 16 disposed between the threaded section 40 on the external engaging sleeve 16 and the end 48 of sleeve 16 which fits into the collar. The threaded sections 40 and 36 of the sleeve 16 and collar 24 can have constant pitch diameters or they can be matingly tapered. Where the threaded sections 40 and 36 are matingly tapered, they are designed to tightly engage at about the same time that the mating tapered surfaces 42 and 46 of the collar 24 and sleeve 16 come into contact with each other so that there is tight engagement between the collar 24 and sleeve 16 along the entire length of the sleeve 16 within the collar 24.

A sealing ring groove 50 adapted to hold an O-ring or other sealing ring is formed in the inner wall of collar 24 between the threaded section 36 and the other end 44 of the collar and is located on the tapered section 42 thereof. An O-ring 52 is positioned within O-ring groove 50 and, as shown in FIGS. 1 and 2, coacts with tapered section 46 of the external engaging sleeve and with the O-ring recess 50 in the collar to effectively seal the joint between the collar and the sleeve. The joint is designed so that the O-ring 52 seals on two tapered surfaces, namely tapers 46 and 42. Therefore, it is virtually impossible to damage the O-ring during assembly of the joint.

Figure 3:
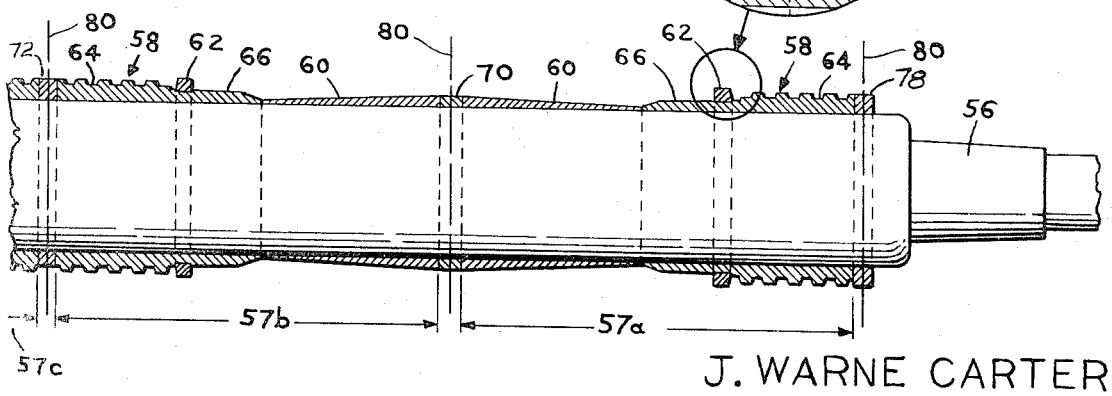
FIG. 3 is a sectional view of the die assembly used to fabricate collars used in the sealing ring joint shown in FIGS. 1 and 2.
Figure 4:
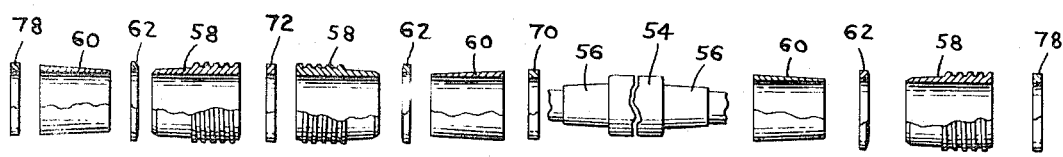
FIG. 4 is an exploded view of FIG. 3.
Figure 5:
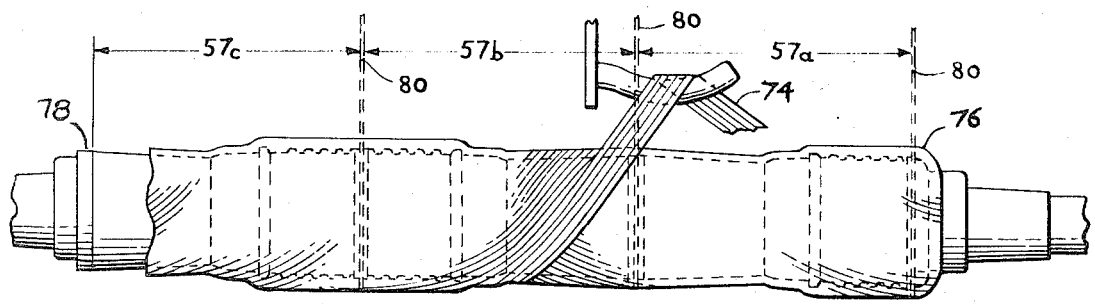
FIG. 5 is a view partially broken away of the completed die assembly shown in FIGS. 3 and 4 during the filament winding operation.

Method of Making the Collars:

As shown in FIGS. 3, 4 and 5, several collars can be made during a single filament winding operation. The first step in the manufacturing method is to arrange several die members into several collar-forming sets which are then assembled on a mandrel to form a die assembly for the filament winding operation. The mandrel 54 is highly-polished and is mounted by means of end portions 56 in a reciprocating winding machine (not shown). The die assembly shown in FIGS. 3 and 4 includes three collar-forming sets 57a, 57b and 57c, each collar-forming set including thread-forming sleeves 58, a taper-forming sleeve 60, and a sealing ring groove die ring 62 which is mounted on the thread-forming sleeve. As shown in the enlarged section of FIG. 3, each thread-forming sleeve includes a thread-forming portion 64 which will be used to form the internal threads of the collar during the winding operation and includes a tapered section 66 to form the internal tapered section 42 of the collar. The sealing ring or O-ring groove die ring 62 is positioned on the tapered section 66 of thread-forming sleeve 58 by a locating shoulder 68. The taper-forming sleeve 60 abuts the tapered end of the thread-forming sleeve 58 when assembled on the mandrel.

As seen in FIGS. 3, 4 and 5, collar-forming set 57b is disposed in mirror image relationship to collar-forming set 57a, so that the wider portion of the taper-forming sleeves of the adjacent collar-forming sets 57a and 57b are adjacent to each other. A spacer 70 is disposed between the adjacent taper-forming sleeves. Similarly, collar-forming set 57c is assembled on the mandrel in mirror image relation to collar-forming set 57b, so that the ends of the thread-forming sleeve 58 in collar-forming sets 57b and 57c are in proximate relation, separated by a spacing ring 72.

From the above, it should be apparent that any number of collar-forming sets can be assembled on the mandrel, depending upon the length of the mandrel.

After the die components are assembled on the mandrel, as shown in FIGS. 3 and 4, the mandrel is then installed in a commercially available and well known reciprocating winding machine. The machine is set up to wind a band of glass filaments coated with resin, indicated as 74 in FIG. 5, over the assembled forming dies at the desired angle necessary to produce a continuous winding, generally indicated at 76, having maximum strength. The glass filaments are delivered to the mandrel through a resin bath (not shown) where, through well-known adjustable regulating controls, the proper amount of resin is picked up and carried to the mandrel. It is preferred to use thermosetting resin compositions; for example, an epoxy resin composition with a suitable hardener or curing agent, polyester resins, or the like. Winding tension on the band is controlled by commonly known commercial methods.

As shown in FIG. 5, the filament 74 is wound over the entire length of the die assembly on the mandrel. End rings 78 of the die assembly serve as dwell shoulders for reversing the winding direction. The wall thickness of the collar is determined by the number of layers of glass and resin applied to the mandrel. After the winding has been completed, heat is applied to the winding 76 of glass filament and resin to speed the curing of the resin. The heating process is carefully controlled as to the temperature, the time of heating, and the rate of cooling, to prevent distorting the dimensions of the continuous winding 76.

After the mandrel assembly has been allowed to cool, the mandrel is pressed out of the dies, leaving the dies in the cured continuous winding. With the mandrel removed, the continuous winding is severed into individual collars, each containing its collar-forming set, by sawing through the continuous winding at lines 80 which are the locations of the spacing rings 70 and 72 and end rings 78.

The taper-forming sleeves 60 and thread-forming sleeves 58 may be made from various materials including metals, such as steel, or non-metals including thermoplastic materials, such as polyethylene. Also, deformable or meltable materials, such as low melting point alloys or eutectic mixtures of inorganic salts may be used. The inorganic salt mixtures have melting points higher than the temperature for curing the resin coating on the continuous winding. A typical composition of these salt mixtures is 53% potassium nitrate, 40% sodium nitrite, and 7% sodium nitrate. For reasons which will be explained later, the sealing ring groove die rings 62 are made from a thermoplastic material, such as polyethylene or a eutectic mixture of inorganic salts, which does not bond to the cured resin material. After the fragments of the spacing rings and end rings are discarded, the taper-forming sleeve 60 can be removed by sliding it from the tapered end portion 44, also referred to as the socket portion, of the collar. The thread-forming sleeve 58 is removed by threading it through the threads which it formed on the collar.

Figure 6:
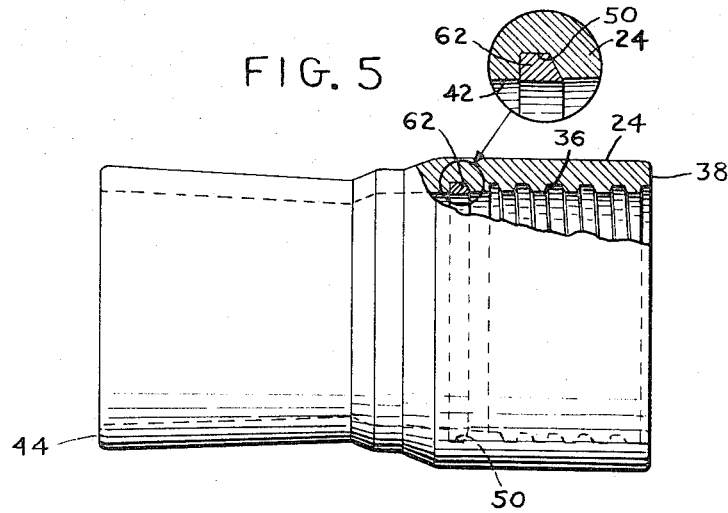
FIG. 6 is a sectional view of the collar formed by the process shown in FIG. 5 with a portion of the die still in the collar prior to its removal.

The sealing ring groove die ring cannot be easily removed from the collar, because it is trapped in the sealing ring groove 50 that it has formed. As shown in FIG. 6, the sealing ring groove die ring 62 is still located in the sealing ring groove 50 formed in the collar after the completed collar has been separated from the continuous winding, and the taper-forming sleeve and thread-forming sleeve have been removed. However, since the sealing ring groove die ring is formed from a thermoplastic material, it can be removed by heating the collar and die ring assembly until the die ring can be deformed sufficiently to withdraw it from the groove without damaging the collar or the die ring.

Where any of the die members are formed from thermoplastic, eutectic inorganic salts, these members may be removed from the completed collar by raising the temperature of the collar above the melting point of the eutectic mixture, and allowing the material to simply flow out of the finished collar.

Before the die components are assembled on the mandrel, they may be coated with mold release material to inhibit the bonding of the resin to the die material and thereby facilitate removal of the die members from the cured collar. A small quantity of this mold release material remains on the thread surfaces of the cured collar and acts as a lubricant when the joint is assembled for use. This lubricating action makes it unnecessary to use additional, and possible contaminated, lubricants when assembling the pipe joint for use.

It should be pointed out that the coupling need not be restricted to a threadable engagement between the collar and the external engaging sleeve. Any other convenient mutually engaging forms, such as lugs, could be used. Additionally, the manufacturing process produces collar pieces which require only a minimum of finishing after the collar-forming die sets are removed from the collar. Further, the coaction of the sealing ring with the collar and external engaging sleeve seals the joint and allows the joint to remain sealed against substantial pressures.

With the pipe joint set forth herein, it is a simple task to assemble and disassemble plastic or non-ferrous piping, without damaging the joints or pipe sections. The joints can be assembled almost independently of the conditions in which the pipe is used, since the only thing done in the field is the threading or other mechanical engaging of the sleeve and collar. Further, the pipe sections are readily reusable because no adhesives are used to connect the threaded ends.

It is believed that the advantages and improved results of the invention will be apparent from the foregoing description of a preferred embodiment of the invention. It will be apparent that various changes and modifications may be made without departing from the spirit and scope of the invention as sought to be defined in the following claims.

We claim:

1. A joint for non-ferrous pipe comprising a first pipe section, a second pipe section, a sleeve having an externally threaded section adjacent one end thereof and an outer tapered section adjacent the threaded section, the sleeve surrounding and being bonded to the first pipe section so that the externally threaded section is inward of the end of the pipe section, a filament wound collar surrounding and bonded to an end of the second pipe section, the collar having an internally threaded section adjacent one end thereof for mating engagement with said externally threaded section, a first inner tapered section narrowing toward the opposite end of the collar adjacent the internally threaded section for mating engagement with said outer tapered section, an internal annular groove in the wall of the collar at said inner tapered section, and a sealing ring in the groove for engagement with the outer tapered section.

2. A joint for non-ferrous pipe according to claim 1 wherein the collar includes a second inner tapered section between said first inner tapered section and said opposite end of the collar, the second inner tapered section having a widening taper toward said opposite end of the collar and in engagement with a matingly tapered surface of said second pipe section.

3. A filament wound collar for assembly with a pipe section, the collar comprising an internally threaded section adjacent one end of the collar, an inner tapered section narrowing toward the opposite end of the collar adjacent the internally threaded section, an internal groove having a sealing ring therein in said tapered section, and a second inner tapered section extending from said opposite end of the collar inwardly toward said inner tapered section, the second inner tapered section widening toward said opposite end of the collar.

4. The filament wound collar according to claim 3 wherein the wall of the collar having the tapered section widening toward said opposite end of the collar has a relatively constant thickness.

* * * * *